United States Patent Office 3,178,817
Patented Apr. 20, 1965

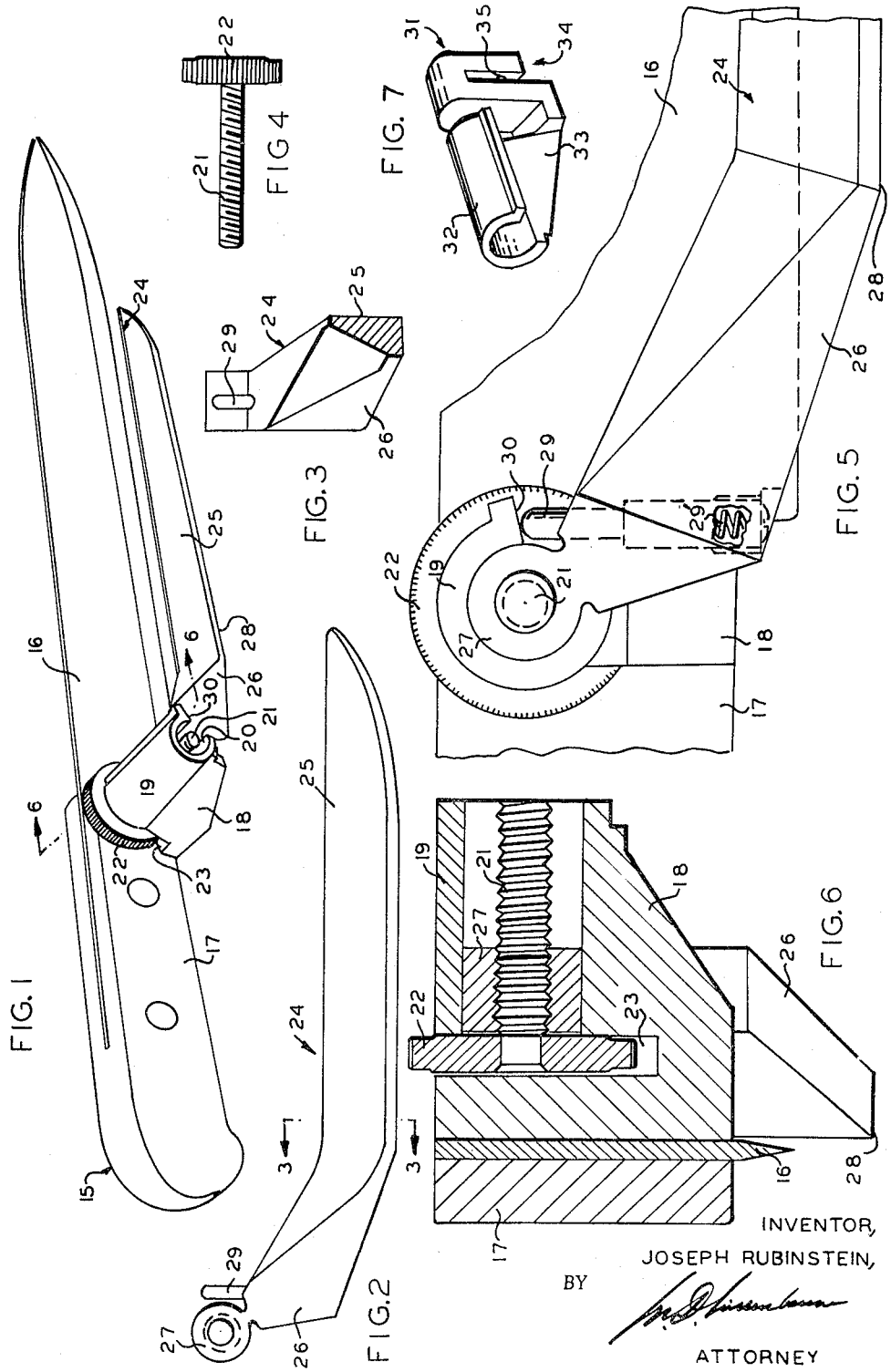

3,178,817
CUTTING IMPLEMENTS
Joseph Rubinstein, Newburgh, N.Y., assignor to General Slicing Machine Co., Inc., Walden, N.Y., a corporation of New York
Filed Mar. 20, 1963, Ser. No. 266,697
3 Claims. (Cl. 30—293)

The present invention relates to a knife for cutting foods by hand and more particularly to the type having a gage blade spaced from and along the knife blade, whereby the slices are uniform in thickness and further, having provision for the adjustment of slice thickness and also that the gage blade will move so that the knife blade could cut all the way through the foodstuff being sliced.

The principal object of this invention is to provide a novel and improved knife structure of the character mentioned wherein the adjustment for thickness of slice is operable by one finger of the hand clutching the knife handle, hence the other hand is never brought to the knife.

Another object thereof is to provide a novel and improved knife of the kind set forth which is of simplified construction, having a minimum of parts which are easily separable so that they can be separately cleaned and which are just as easily assembled to have the knife and its appurtenances in use condition.

A further object thereof is to provide a novel and improved construction involving a novel assembly manner.

Another object thereof is to provide a novel and improved construction which lends aesthetic quality to the item.

A further object is to be able to have this invention incorporated as an attachment to any knife.

Still a further object of this invention is to provide in combination with a knife, novel and improved means of the kind set forth, which has the mentioned attributes, is reasonable in cost to manufacture and which is efficient in carrying out the purposes for which it is designed.

Other objects and advantages will become apparent as this disclosure proceeds.

For the practice of this invention, I have provided a horizontal channel extending perpendicular to, but spaced from the plane of one face of the cutting blade of a knife, on suitable supporting structure at the inner end region of the knife's handle, which support means may be integral with the handle or suitable to be clamped onto the cutting blade. One end of the elongated gage member is formed as a nut which can be slid into said channel and fits rotatably therein; such entrance being into an open end of said channel, and the permitted rotation is limited so that the gage blade or rod can swing from a position where it extends at least in part downwardly from the plane of the knife's cutting edge to an upward position where said gage member is on such plane. A spring-biased plunger extending upwardly from the gage member, acts against a ledge on the channel member so that said gage member is urged downwardly. The underside of said gage member is so shaped that when it contacts the surface on which the food mass to be or being sliced rests, said gage member will be cammed to swing upwardly to permit the knife blade to cut the slice clear through. There is a headed screw which can be entered laterally into the said channel so that its head, which is a turning knob is within the space between the knife and said channel and is of a size to be accessible for manipulation. Said screw is for threaded engagement with said terminal nut on the gage member.

In the accompanying drawing forming part of this specification, similar characters of reference indicate corresponding parts in all the views, FIG. 1 is a perspecitve view of a knife embodying the teachings of this invention.
FIG. 2 is an elevational view of the gage member.
FIG. 3 is a section taken at line 3—3 in FIG. 2.
FIG. 4 is a longitudinal view of the knobbed screw.
FIG. 5 is a fragmentary view of the structure shown in FIG. 1.
FIG. 6 is a section taken at line 6—6 in FIG. 1.
FIG. 7 is a perspective view of the part to be attached to any knife when this invention is made to be attached, rather than said part to be an integral element with the knife handle as shown in FIG. 1.

The FIGS. 1 and 7 are drawn to the same scale.
The FIGS. 2, 3 and 4 are drawn to a slightly enlarged scale.
The FIGS. 5 and 6 are very much enlarged.

In the drawing, the numeral 15 designates generally a hand knife comprised of the usual cutting blade 16 having a handle 17 at one end thereof. A bracket 18 extends laterally from one face of the handle, here shown from the right face, and said bracket supports a horizontally positioned channel indicated generally by the numeral 19, which is above the line of the blade's cutting egde and perpendicular to the plane of said blade; the lengthwise opening of said channel being away from the outer end of the handle, and the inward end of said channel being spaced from said handle face. The inner wall 20 of said channel determines the greater part of a cylinder. The lengthwise opening of said channel is wide enough to admit the screw 21 by a lateral movement of said screw into the channel and when so entered, the head or knob secured at one end of said screw, will fit for rotation in the space 23 existing between the handle 17 and the inner end of said channel 19.

A gage member denoted generally by the numeral 24, includes a blade part 25 which is along the knife blade 16, and in normal rest position, said gage blade extends at least in part, below the cutting edge of the knife blade. Said gage blade 25 preferably presents a flat surface, parallel with and directly opposite the plane of the knife blade. Said gage blade has extending therefrom, the arm 26 which is entered in said channel where it terminates in a cylindrical eye 27 which is internally threaded to serve as a nut on said screw 21. This eye is slidably and rotatably fitted in the channel 19; such rotary movement being limited between the edges determining the lengthwise opening of said channel.

The underside of the arm part 26 of the gage member, is preferably straight and extends upwardly towards the channel 19, thereby creating a cam at 28, which latter when in contact with the surface on which the material being sliced rests, and then upon further downward movement of the knife, will cause the gage member 24 to be swung upwardly to allow the knife to slice the material clear through. Said gage member houses a plunger 29 biased upwardly by a spring 29', whereby said plunger is urged upwardly above the top surface of the arm part 26, to be in constant contact with the ledge 30 along the channel 19. This serves to restore the gage member 24 to normal rest position which is shown in FIG. 1, when the knife is lifted. To provide such ledge 30, the channel may have the cross-section of a question mark shape; the stem of such shape, offering such ledge. The knife handle 17, the bracket 18 and the channel 19, may be a one-piece molded item of metal, plastic or other suitable material.

It is evident that turning the knob 22, will determine the distance between the knife blade 16 and the gage and thereby the thickness of slice effected. Such knob is manipulated by the thumb of the hand holding the knife. Use of the other hand to do this is unnecessary. Although the article as illustrated is for the usual right-handed user, it may be made with the channel 19 at the other face of the handle 17, for left-handed people, in which instance the gage member 24 is made a left of the one shown. It is further evident that the gage member and the knobbed screw can be easily separated from the assembly to be cleaned as well as the knife proper and then reassembled for use.

If desired, any hand knife can be fitted with this invention by use of the item indicated generally by the numeral 31, wherein the channel 32 and its supporting bracket 33 can have a clamp 34 to have a suitable clamping screw (not shown) through the threaded hole 35, for attachment to the cutting blade adjacent the inner end of the knife's handle 17.

Also if desired, the channels 19 and 32 may be made a bit longer than shown, to close the open end of the channel with a removable plug (not shown) after the eye 27 of the gage member has been entered into said channel through said end while the screw 21 is turned to effect such entrance while threaded engagement with said eye is effected.

In the preferred embodiment illustrated, the use of the channel 19 or 32 provides not only a track means and bearing for the gage member 25, but also serves as a decorative shield hiding the mechanism it houses. A good aesthetic effect is had when the handle, the support element 18 and the channel 19 are of one color plastic and the turn knob 22 of another.

It is to be especially noted that this cutting implement consists of three separable parts, easy to disassemble to be cleaned and just as easy to be put together for use and that only one hand is used to handle the knife and adjust for slice thickness.

This invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific constructions and description herein to indicate the scope of this invention.

I claim:
1. In a cutting implement of the character described, a hand knife comprising a cutting blade having a handle at one end thereof, a horizontal channel supported on an element extending from said knife; said channel being spaced from said cutting blade and substantially perpendicular to the plane of said cutting blade, a ledge adjacent to and along said channel; said channel being positioned with its longitudinal opening farthest from the free end of said handle; the interior of said channel holding a cylindrical form slidably and rotatably fitted therein; said cylindrical form being incapable of leaving the channel by a lateral movement out of said opening, an elongated gage element positioned along said cutting blade and normally extending to a plane below that of said cutting blade; said gage element also having an arm extending therefrom into said opening of said channel; the upper end of said arm forming said cylindrical form and being formed as an eye; said eye being internally threaded, a screw extending within and along said channel and threadedly engaging said threaded eye, an accessible knob positioned and fitted in the space between said channel and the knife; said knob being secured on the inner end of said screw; the lengthwise opening of said channel being wide enough to allow passage of said screw therethrough by moving said screw laterally when said screw is disengaged from said threaded eye, and a spring-biased plunger carried by said gage element and bearing against said ledge at all positions of said gage element along the screw; said plunger urging said gage element downwardly; said gage arm being removable from out of an end of said channel when free of said screw.

2. A cutting implement as defined in claim 1, wherein said channel and its supporting element are integral with the knife handle.

3. A cutting implement as defined in claim 1, wherein said supporting element includes means for releasably attaching it to the knife.

References Cited by the Examiner
UNITED STATES PATENTS 1,939,737 12/33 Thomson.
2,478,046 8/49 Higgs _____ 30—293
3,091,854 6/63 Mannerberg _____ 30—283

FOREIGN PATENTS 453,589 12/27 Germany.

WILLIAM FELDMAN, *Primary Examiner.*